US012744816B2

(12) United States Patent
Loger et al.

(10) Patent No.: US 12,744,816 B2
(45) Date of Patent: Sep. 22, 2026

(54) CENTRALIZED COMPLIANCE MANAGEMENT PLATFORM FOR SECURITY OBJECTS

(71) Applicant: Entrust Corporation, Shakopee, MN (US)

(72) Inventors: Michael Gerhard Loger, Munich (DE); Tushar Tambay, Sunnyvale, CA (US); Shardul Divatia, Fremont, CA (US); Elsa Bignoli, San Carlos, CA (US); Lucas Crawford, San Jose, CA (US); Laxmana Kumar Bhavandla, Pfugerville, TX (US); Mang Kang Yong, Concorde, CA (US); Patti Powers, Auburn, NH (US)

(73) Assignee: Entrust Corporation, Shakopee, MN (US)

( * ) Notice: Subject to any disclaimer, the term of this patent is extended or adjusted under 35 U.S.C. 154(b) by 119 days.

(21) Appl. No.: 18/411,632

(22) Filed: Jan. 12, 2024

(65) Prior Publication Data

US 2024/0244083 A1 Jul. 18, 2024

Related U.S. Application Data

(60) Provisional application No. 63/438,839, filed on Jan. 13, 2023.

(51) Int. Cl.
*H04L 9/40* (2022.01)
*H04L 41/22* (2022.01)

(52) U.S. Cl.
CPC .............. *H04L 63/20* (2013.01); *H04L 41/22* (2013.01); *H04L 63/0435* (2013.01)

(58) Field of Classification Search
CPC ...... H04L 63/0435; H04L 63/20; H04L 41/22
See application file for complete search history.

(56) References Cited

U.S. PATENT DOCUMENTS 7,934,248 B1 * 4/2011 Yehuda .................. H04L 63/20 713/153
11,503,078 B2 * 11/2022 Parekh ................. G06F 21/577
(Continued)

OTHER PUBLICATIONS

Sabharwal, Navin, Sarvesh Pandey, and Piyush Pandey. "Infrastructure-as-Code Automation Using Terraform, Packer, Vault, Nomad and Consul: Hands-on Deployment, Configuration, and Best Practices." (Year: 2021).*

(Continued)

*Primary Examiner* — John M MacIlwinen
(74) *Attorney, Agent, or Firm* — Merchant & Gould P.C.

(57) ABSTRACT

A centralized compliance platform usable to manage security policies associated with security objects, such as keys, secrets, and certificates. Such a centralized compliance platform performs discovery across the enterprise to obtain information about the varying security objects used by that organization, for example via application programming interface (API) connections to enterprise key and secret vaults, as well as certificate storage locations. The platform may generate a user interface at which compliance with enterprise policies may be monitored, which individual compliance issues for specific security objects able to the sorted, searched, and filtered. The platform may also generate one or more actions that may be taken in response to detected compliance issues, for example to generate alerts in response to noncompliant security objects or storage locations.

20 Claims, 14 Drawing Sheets

(56) References Cited

U.S. PATENT DOCUMENTS

| | | | | |
|---|---|---|---|---|
| 2012/0185911 | A1* | 7/2012 | Polite | H04L 63/102 726/1 |
| 2015/0172321 | A1 | 6/2015 | Kirti et al. | |
| 2016/0314144 | A1 | 10/2016 | Joshi et al. | |
| 2016/0342588 | A1 | 11/2016 | Judd | |
| 2016/0373263 | A1* | 12/2016 | Zaidi | H04L 9/3265 |
| 2017/0099292 | A1 | 4/2017 | Kelley et al. | |
| 2017/0251013 | A1 | 8/2017 | Kirti et al. | |
| 2018/0027006 | A1 | 1/2018 | Zimmermann et al. | |
| 2018/0191730 | A1 | 7/2018 | Deters et al. | |
| 2018/0234459 | A1* | 8/2018 | Kung | H04L 63/0263 |
| 2018/0255099 | A1 | 9/2018 | Chen et al. | |
| 2019/0229896 | A1* | 7/2019 | Charters | H04L 9/3247 |
| 2020/0134207 | A1* | 4/2020 | Doshi | H04L 47/822 |
| 2021/0211283 | A1* | 7/2021 | Wang | H04L 9/0819 |
| 2021/0288798 | A1* | 9/2021 | Vadhera | H04L 9/083 |
| 2022/0103338 | A1* | 3/2022 | Brooker | G06F 21/6218 |
| 2022/0171869 | A1 | 6/2022 | Chin et al. | |
| 2023/0004671 | A1* | 1/2023 | Buchan | H04L 9/088 |
| 2023/0177435 | A1* | 6/2023 | Sailer | G06Q 10/0637 705/7.28 |
| 2024/0187376 | A1* | 6/2024 | Moghe | G06N 20/00 |
| 2024/0330015 | A1* | 10/2024 | Modesitt | G06F 9/44505 |

OTHER PUBLICATIONS

International Search Report and Written Opinion for PCT/US2024/011430, mailed May 13, 2024.
Extended European Search Report for Application No. 24742093.8 mailed Jun. 25, 2026.

* cited by examiner

600

Compliance Hub

Dashboard

Groups

Vaults

Security Objects

Compliance

Documentation

Settings

602

Vaults

A vault is a secured collection of security objects

900

| Name | Group | Security Objects | Compliance | Documentation |
|---|---|---|---|---|
| AWS-Azure BYOK (Azure) | BMW EU | 4 | No Policies | No Assignment |
| AWS-Azure BYOK (AWS) | BMW EU | 15 | No Policies | No Assignment |
| KMIP Vault | BMW EU | 50 | No Policies | No Assignment |
| Secrets Vault | BMW EU | 3 | No Policies | No Assignment |

Compliance Hub

- Dashboard
- Groups
- Vaults
- Security Objects
- Compliance
- Documentation
- Settings

602

Security Objects

Keys and Secrets

1000

| Name | Group | Vault | Type | Created |
|---|---|---|---|---|
| EKSAkey1 | BMW EU | AWS-Azure BYOK | BYOK Azure | |
| EKSAkey2 | BMW EU | AWS-Azure BYOK | BYOK Azure | |
| KeyHubAzure1 | BMW EU | AWS-Azure BYOK | BYOK Azure | |
| KeyHubAzure2 | BMW EU | AWS-Azure BYOK | BYOK Azure | |
| Testkey1 | BMW EU | AWS-Azure BYOK | BYOK AWS | |
| Testkey2 | BMW EU | AWS-Azure BYOK | BYOK AWS | |
| Testkey3 | BMW EU | AWS-Azure BYOK | BYOK AWS | |
| Testkey4 | BMW EU | AWS-Azure BYOK | BYOK AWS | |
| Testkey5 | BMW EU | AWS-Azure BYOK | BYOK AWS | |
| Testkey6 | BMW EU | AWS-Azure BYOK | BYOK AWS | |
| Testkey7 | BMW EU | AWS-Azure BYOK | BYOK AWS | |

CENTRALIZED COMPLIANCE MANAGEMENT PLATFORM FOR SECURITY OBJECTS

The present application claims priority from U.S. Provisional Patent Application No. 63/438,839, filed on Jan. 13, 2023, the disclosure of which is hereby incorporated by reference in its entirety.

BACKGROUND

Large enterprises store a wide variety of types of secure data. Such secure data is typically maintained in a secure state through use of security objects, for example, encryption keys, secrets, and certificates. Such security objects may be maintained in various secure storage locations, for example in an on-premises appliance, such as a Hardware Security Module (HSM), or within various virtual appliances like key vaults, secret vaults, or certificate storage locations either within the enterprise or within private or public cloud storage.

To maintain enterprise data securely, these security objects are typically maintained with a goal of compliance with predefined enterprise security standards. For example, certificates that include encryption keys therein may be inspected to ensure that the encryption key is of adequate length to meet enterprise standards. However, such maintenance may be difficult, because certain security objects, such as keys and secrets, may be maintained within distributed physical or virtual "vaults" throughout an enterprise. Such vaults may be distributed across an organization and represent the single control point for each respective security objects maintained by those vaults.

SUMMARY

Generally speaking, the present disclosure is related to a centralized compliance platform usable to manage security policies associated with security objects, such as keys, secrets, and certificates. Such a centralized compliance platform performs discovery across the enterprise to obtain information about the varying security objects used by that organization, for example via application programming interface (API) connections to enterprise key and secret vaults, as well as certificate storage locations. The platform may generate a user interface at which compliance with enterprise policies may be monitored, which individual compliance issues for specific security objects able to the sorted, searched, and filtered. The platform may also generate one or more actions that may be taken in response to detected compliance issues, for example to generate alerts in response to noncompliant security objects or storage locations for such mechanisms (e.g., key vaults). Policy updates may be deployed from the platform to distributed security object storage locations to ensure compliance at such locations for all security objects (e.g. keys, secrets, and certificates and the like) maintained therein.

In a first aspect, a security object compliance management platform includes a computing system including a processor and memory. The memory stores instructions executable by the processor to receive connection parameters for each of a plurality of distributed vaults, each vault storing security information used by an enterprise, the connection parameters including a vault location and account details useable for access to security objects maintained within the respective vault, and, based on the connection parameters, communicatively connecting to each of the plurality of distributed vaults. The instructions further cause the processor to determine one or more enterprise compliance policies applicable to security objects maintained across the enterprise, and generate an administrative user interface at the compliance management platform, the administrative user interface having a plurality of views including a dashboard view, a vault connection view, a security object view, and a compliance view. The instructions further cause the processor to automatically generate one or more compliance alerts based, at least in part, on a comparison of the one or more enterprise compliance policies to information associated with the security objects across the plurality of distributed vaults, the one or more compliance alerts being presented in at least one of the plurality of views.

In a second aspect, a method of managing compliance with security policies of an enterprise for one or more security objects maintained across a distributed set of security object storage locations is disclosed. The method includes receiving connection parameters for each of a plurality of distributed security object storage locations, each security object storage location storing security information used by an enterprise, the connection parameters including a vault location and account details useable for access to security objects maintained within the respective security object storage location. The method also includes, based on the connection parameters, communicatively connecting to each of the plurality of distributed security object storage location, and determining one or more enterprise compliance policies applicable to security objects maintained across the enterprise. The method further includes generating an administrative user interface at the compliance management platform, the administrative user interface having a plurality of views including a dashboard view, a vault connection view, a security object view, and a compliance view. The method includes automatically generating one or more compliance alerts based, at least in part, on a comparison of the one or more enterprise compliance policies to information associated with the security objects across the plurality of distributed security object storage locations, the one or more compliance alerts being presented in at least one of the plurality of views.

In a third aspect, a non-transitory computer-readable medium comprising computer-executable instructions installed thereon is provided. The computer-executable instructions are executable by a computing system to cause the computing system to perform a method of managing compliance with security policies of an enterprise for one or more security objects maintained across a distributed set of security object storage locations. The method includes receiving connection parameters for each of a plurality of distributed security object storage locations, each security object storage location storing security information used by an enterprise, the connection parameters including a vault location and account details useable for access to security objects maintained within the respective security object storage location. The method also includes, based on the connection parameters, communicatively connecting to each of the plurality of distributed security object storage location, and determining one or more enterprise compliance policies applicable to security objects maintained across the enterprise. The method further includes generating an administrative user interface at the compliance management platform, the administrative user interface having a plurality of views including a dashboard view, a vault connection view, a security object view, and a compliance view. The method includes automatically generating one or more compliance alerts based, at least in part, on a comparison of the one or more enterprise compliance policies to information associated with the security objects across the plurality of distributed security object storage locations, the one or more compliance alerts being presented in at least one of the plurality of views.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 9 is an example centralized user interface generated by a centralized compliance platform and displaying a distributed storage location display view, according to an example embodiment.

FIG. 10 is an example centralized user interface generated by a centralized compliance platform and displaying a detected security objects view, according to an example embodiment.

FIG. 12 is an example centralized user interface generated by a centralized compliance platform and displaying a security objects storage location compliance view, according to an example embodiment.

DETAILED DESCRIPTION

Figure 1:
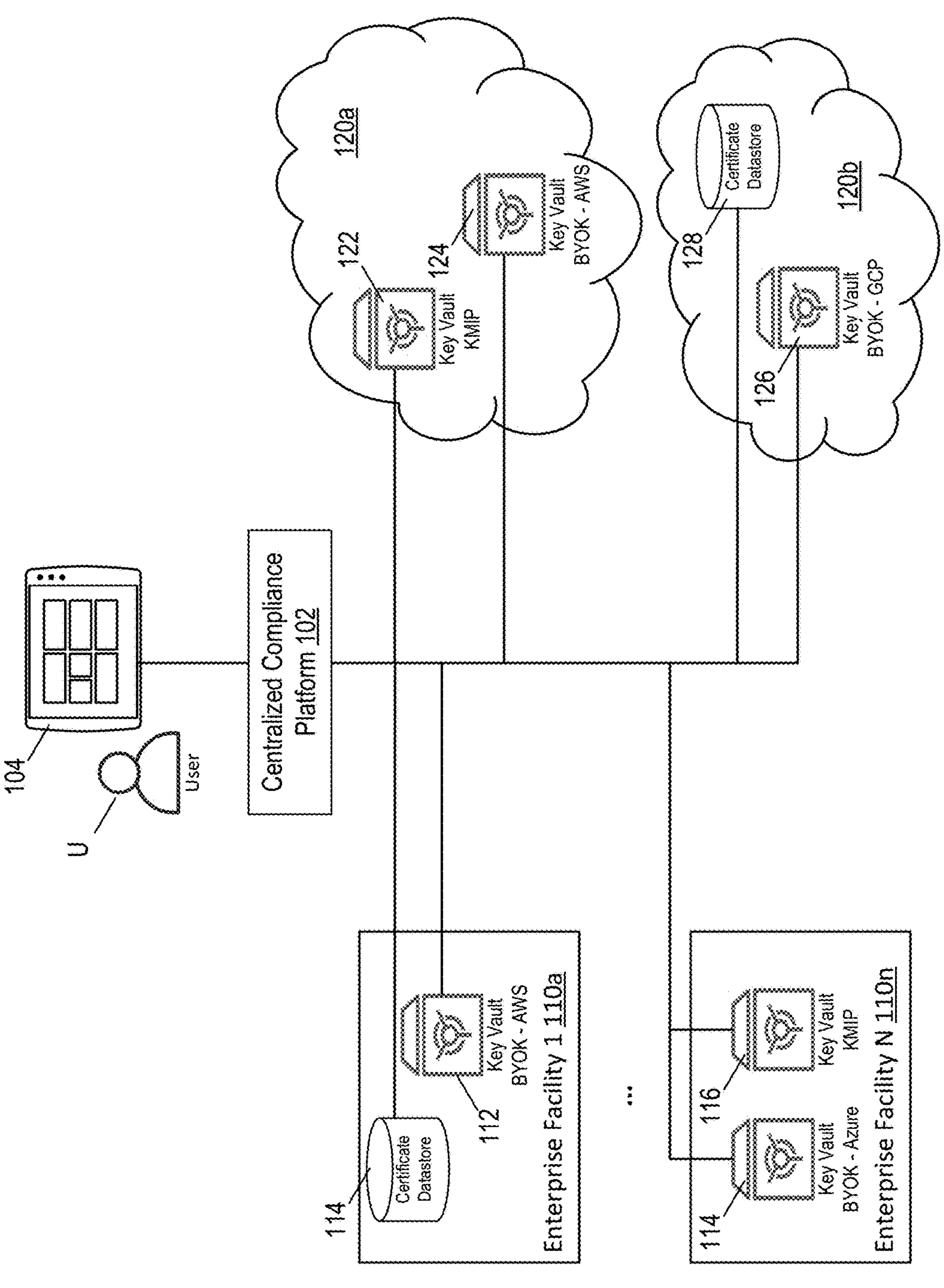
FIG. 1 illustrates an example enterprise environment in which aspects of a centralized compliance platform may be implemented.

As briefly described above, embodiments of the present invention are directed to a centralized compliance platform usable to manage security policies associated with security objects, such as keys, secrets, and certificates. Such a centralized compliance platform performs discovery across the enterprise to obtain information about the varying security objects used by that organization, for example via application programming interface (API) connections to enterprise key and secret vaults, as well as certificate storage locations. The platform may generate a user interface at which compliance with enterprise policies may be monitored, which individual compliance issues for specific security objects able to the sorted, searched, and filtered. The platform may also generate one or more actions that may be taken in response to detected compliance issues, for example to generate alerts in response to noncompliant security objects or storage locations for such mechanisms (e.g., key vaults). Policy updates may be deployed from the platform to distributed security object storage locations to ensure compliance at such locations for all security objects (e.g. keys, secrets, and certificates and the like) maintained therein.

In examples, the centralized compliance platform, also referred to herein as a compliance management platform, allows for a single view of compliance with enterprise security policies for security objects that are maintained within secure storage locations across an enterprise without requiring centralization of those security objects. Rather, security objects (e.g., keys, secrets, certificates, and the like) may be maintained within distributed storage locations (e.g., key vaults, secret vaults, and secure certificate databases, and the like) within the enterprise, and metadata describing such security objects and their storage locations may be collected. In this way, compliance with enterprise standards as to the strength of the security object and security level of the storage location at which such security objects are maintained can be assessed and quickly reported to administrative personnel (e.g., enterprise security administrators).

In further examples, enterprise security administrators may define one or more compliance tests to be performed on security objects and storage locations using such a platform. These definitions may be used to test the security objects in a flexible way. Additionally, the centralized compliance platform may both generate alerts that are presented within a user interface when defined compliance tests are not passed, and may also distribute compliance tests and/or standards to distributed storage locations to ensure storage policies, key generation/length/algorithm policies, and the like are maintained at each location in a way that is compliant with centralized enterprise standards.

Certain features of a centralized compliance platform, as described in further detail below; may achieve a number of advantages relative to existing solutions for compliance. Because large enterprises may be distributed across a variety of legal jurisdictions (e.g., countries or regions), local security object and other data storage laws may be maintained within each jurisdiction, rather than requiring centralized storage. Furthermore, the user interface provided by such a platform may be separated from the locations at which security objects, such as keys, are stored. Individual storage locations, such as key vaults or secret vaults, may be individually added or removed from being managed using the centralized compliance platform, making upgrade and scalability straightforward. Additionally, integration with heterogeneous storage location types (e.g., various key vaults provided by different manufacturers, secret vaults, certificate storage locations, and the like) is also straightforward for an enterprise administrator.

Referring now to FIG. 1, an example enterprise environment 100 is shown, in which aspects of a centralized compliance platform may be implemented. Sales, a centralized compliance 102 may generate and present a user interface to a user U, for example on a user device 104. The user device 104 may be located locally to, or remote from, the centralized compliance platform 102.

In the example shown, the centralized compliance platform 102 may be configured to discover, and connect to, a plurality of enterprise security object storage locations. The centralized compliance platform 102 may be configured to discover details regarding such security object storage locations, as well as the security objects stored therein.

In the example shown, and enterprise may have a plurality of enterprise facilities 110*a*-*n*, at which various computing resources may be located. Such computing resources may include, for example, key vaults, certificates storage databases, secret vaults, and the like. Various types of key or secret vaults may be maintained at each facility. For example, a Key Management Interoperability Protocol (KMIP) vault, a secrets vault, and/or a Transparent Data Encryption (TDE) key vault may be implemented. In the example shown, a first enterprise facility 110*a* includes a first key vault 112, as well as a certificate database 114. A second enterprise facility 110*n* includes two additional key vaults 116, 114. Key vaults 116, 114 are shown to be different types of key vaults, e.g. specific to various cloud security keys, local keys, and the like.

In addition to the enterprise facilities 110*a*-*n*, one or more cloud storage locations 120*a*-*b* may be included within control of an enterprise, and may host various types of security object storage locations. In the example shown, a first cloud storage location 120*a* includes two different key vaults 122, 124, each representing a different type of key vault (e.g., a KMIP vault and a "Bring Your Own Key" (BYOK) vault). A second cloud storage location 120*b* can include a further key vault 126, as well as a certificate data store 128. In the example shown, although the first and second cloud storage locations each maintain a BYOK vault (e.g., vaults 124, 126), these key vaults may store different types of keys, for example keys associated with different cloud storage providers, such as Amazon, Google, Azure, and the like.

In example implementations, the centralized compliance platform 102 may be configured to perform a discovery process across the various security object storage locations, for example by automatically analyzing an enterprise infrastructure to identify particular storage locations. In further embodiments, the centralized compliance platform 102 may receive a definition of a storage location, for example from a user via a user interface at user device 104. Examples of receipt of such a definition of a security object storage location are provided below.

Figure 2:
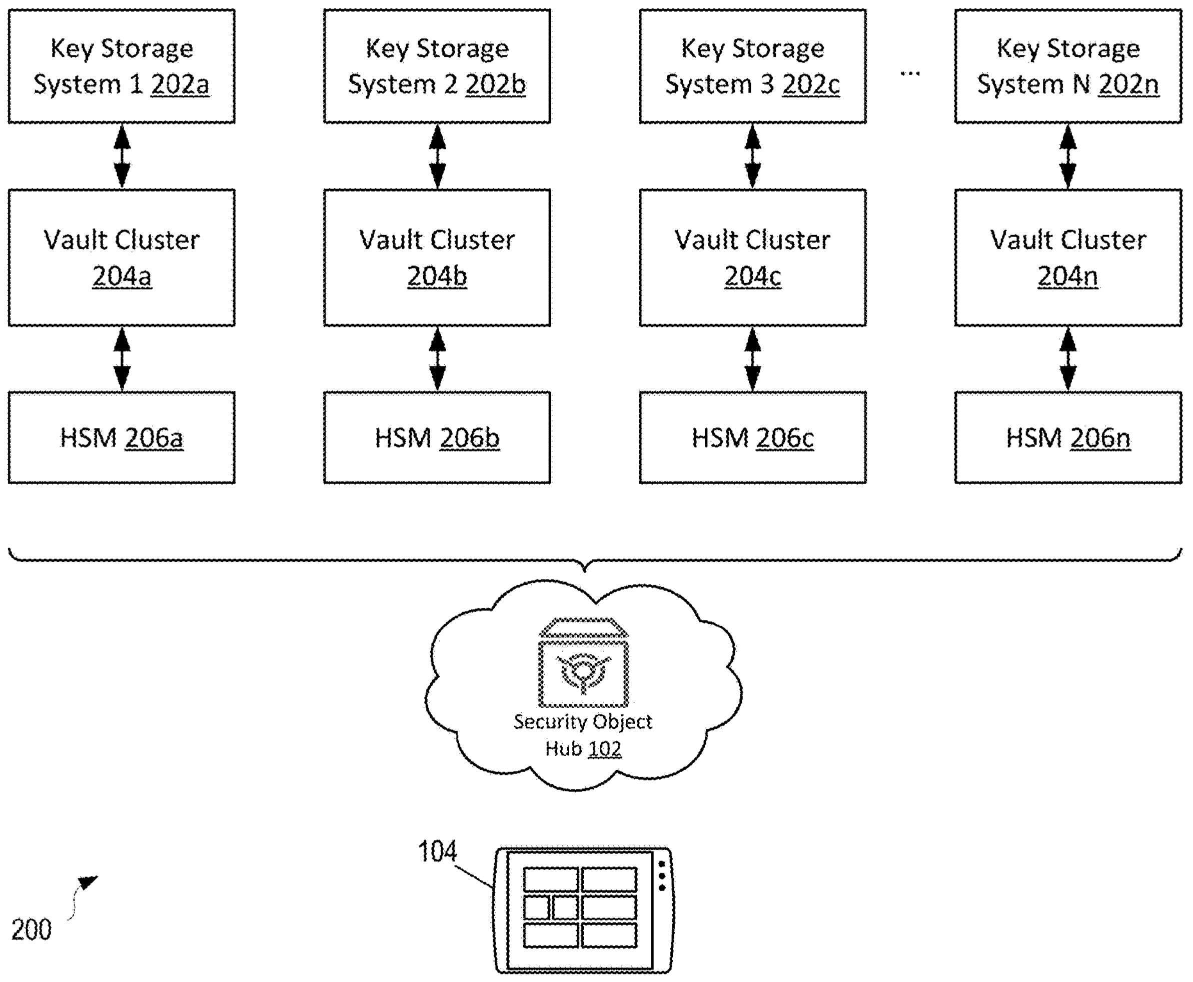
FIG. 2 illustrates connection of a centralized compliance platform to a plurality of security object storage systems, according to an example embodiment.

FIG. 2 illustrates connection of a centralized compliance platform 102 to a plurality of security object storage systems, according to an example embodiment. The security object storage systems described herein may represent, or correspond to, the various security object storage locations described above in conjunction with FIG. 1. As above, the centralized compliance platform 102 may be communicatively connected to a user device 104, for viewing and management of security objects and security object storage locations in accordance with principles of the present disclosure.

In particular, FIG. 2 illustrates a hardware arrangement 200 that includes a plurality of key storage systems 202*a*-*n*. Each key storage system 202 may be associated with a different vault cluster 204 (individually referred to as vault clusters 204*a*-*n*), which may be communicatively connected with, or integrated with, a hardware security module (HSM) 206 (individually referred to as HSMs 206*a*-*n*) located at any of a variety of locations within the enterprise. In implementations where the centralized compliance platform 102 receives an identification of a particular security object storage location, the centralized compliance platform 102 may be configured to communicatively connect to any of a key storage system 202, vault cluster 204, or hardware security module 206 directly to obtain security object storage information, including details regarding individual security objects and details regarding the location in which those objects are stored.

Figure 3:
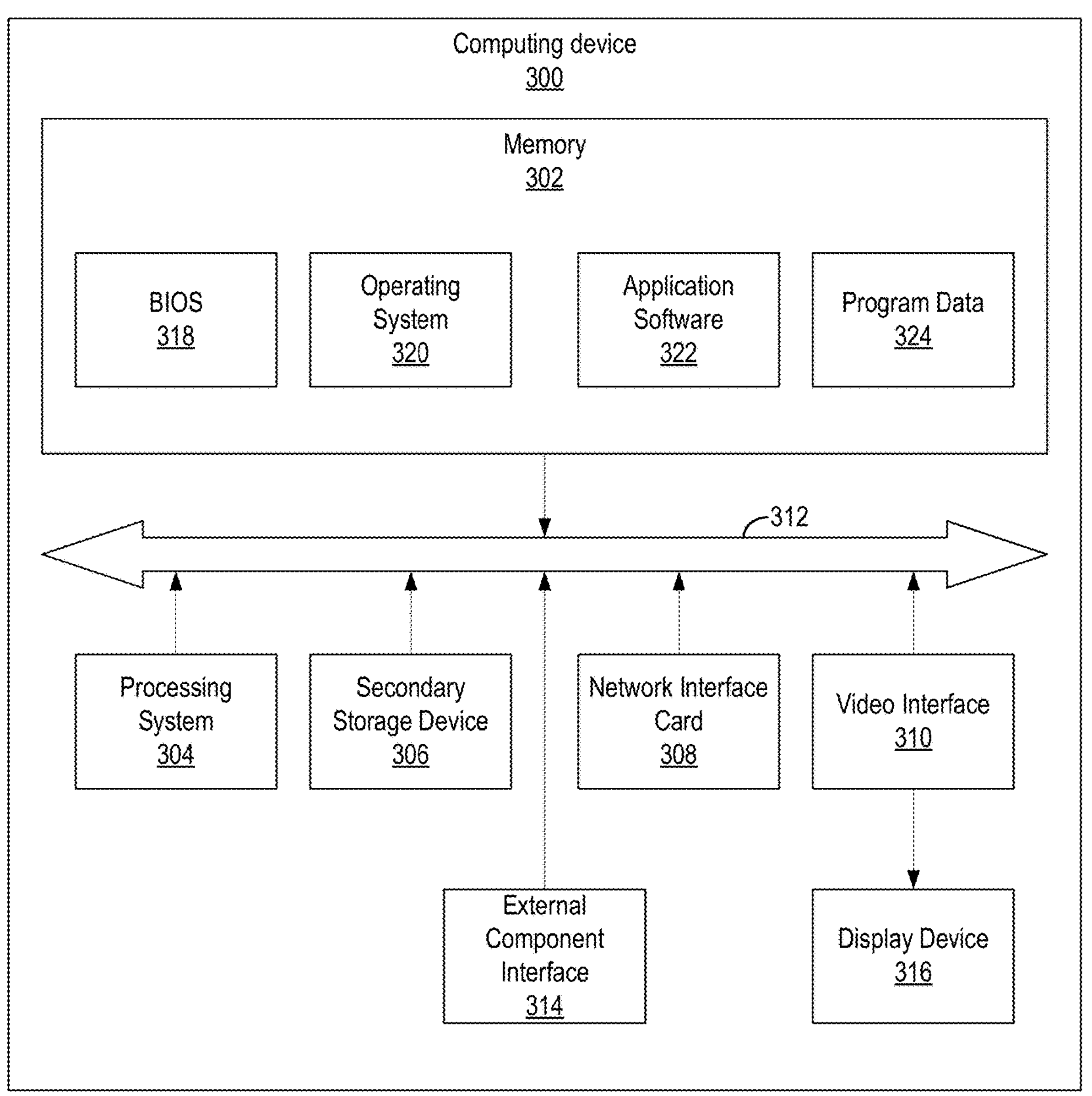
FIG. 3 illustrates a computing device on which aspects of the present disclosure may be implemented.

FIG. 3 illustrates an example computing system 300 on which aspects of the present disclosure may be implemented. The computing device 300 can be used, for example, to implement computing devices such as the centralized compliance platform 102, the user device 104, or various enterprise hardware used to implement the security object storage locations described herein.

In the example of FIG. 3, the computing device 300 includes a memory 302, a processing system 304, a secondary storage device 306, a network interface card 308, a video interface 310, a display unit 313, an external component interface 314, and a communication medium 316. The memory 302 includes one or more computer storage media capable of storing data and/or instructions. In different embodiments, the memory 302 is implemented in different ways. For example, the memory 302 can be implemented using various types of computer storage media, and generally includes at least some tangible media. In some embodiments, the memory 302 is implemented using entirely non-transitory media.

The processing system 304 includes one or more processing units, or programmable circuits. A processing unit is a physical device or article of manufacture comprising one or more integrated circuits that selectively execute software instructions. In various embodiments, the processing system 304 is implemented in various ways. For example, the processing system 304 can be implemented as one or more physical or logical processing cores. In another example, the processing system 304 can include one or more separate microprocessors. In yet another example embodiment, the processing system 304 can include an application-specific integrated circuit (ASIC) that provides specific functionality. In yet another example, the processing system 304 provides specific functionality by using an ASIC and by executing computer-executable instructions.

The secondary storage device 306 includes one or more computer storage media. The secondary storage device 306 stores data and software instructions not directly accessible by the processing system 304. In other words, the processing system 304 performs an I/O operation to retrieve data and/or software instructions from the secondary storage device 306. In various embodiments, the secondary storage device 306 includes various types of computer storage media. For example, the secondary storage device 306 can include one or more magnetic disks, magnetic tape drives, optical discs, solid-state memory devices, and/or other types of tangible computer storage media.

The network interface card 308 enables the computing device 300 to send data to and receive data from a communication network. In different embodiments, the network interface card 308 is implemented in different ways. For example, the network interface card 308 can be implemented as an Ethernet interface, a fiber optic network interface, a wireless network interface (e.g., WiFi, WiMax, Bluetooth, etc.), or another type of network interface.

In optional embodiments where included in the computing device 300, the video interface 310 enables the computing device 300 to output video information to the display unit 313. The display unit 313 can be various types of devices for displaying video information, such as an LCD display panel, a plasma screen display panel, a touch-sensitive display panel, an LED or OLED screen, a cathode-ray tube display, or a projector. The video interface 310 can communicate with the display unit 313 in various ways, such as via a Universal Serial Bus (USB) connector, a VGA connector, a digital visual interface (DVI) connector, an S-Video connector, a High-Definition Multimedia Interface (HDMI) interface, or a Display Port connector.

The external component interface 314 enables the computing device 300 to communicate with external devices. For example, the external component interface 314 can be a USB interface and/or another type of interface that enables the computing device 300 to communicate with external devices or peripheral devices integrated within the same housing (e.g., in the case of mobile devices). In various embodiments, the external component interface 314 enables the computing device 300 to communicate with various external components, such as external storage devices, input devices, speakers, modems, media player docks, other computing devices, scanners, digital cameras, and fingerprint readers.

The communication medium 316 facilitates communication among the hardware components of the computing device 300. The communications medium 316 facilitates communication among the memory 302, the processing system 304, the secondary storage device 306, the network interface card 308, the video interface 310, and the external component interface 314. The communications medium 316 can be implemented in various ways. For example, the communication medium 316 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 302 stores various types of data and/or software instructions. The memory 302 stores a Basic Input/Output System (BIOS) 318 and an operating system 320. The BIOS 318 includes a set of computer-executable instructions that, when executed by the processing system 304, cause the computing device 300 to boot up. The operating system 320 includes a set of computer-executable instructions that, when executed by the processing system 304, cause the computing device 300 to provide an operating system that coordinates the activities and sharing of resources of the computing device 300. Furthermore, the memory 302 stores application software 322. The application software 322 includes computer-executable instructions, that when executed by the processing system 304, cause the computing device 300 to provide one or more applications. The memory 302 also stores program data 324. The program data 324 is data used by programs that execute on the computing device 300.

Although particular features are discussed herein as included within an electronic computing device 300, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include various types of dynamic random access memory (DRAM), solid state memory, read-only memory (ROM), electrically-erasable programmable ROM, magnetic disks (e.g., hard disks, floppy disks, etc.), and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

It is noted that, in some embodiments of the computing device 300 of FIG. 3, the computer-readable instructions are stored on devices that include non-transitory media. In particular embodiments, the computer-readable instructions are stored on entirely non-transitory media.

Figure 4:
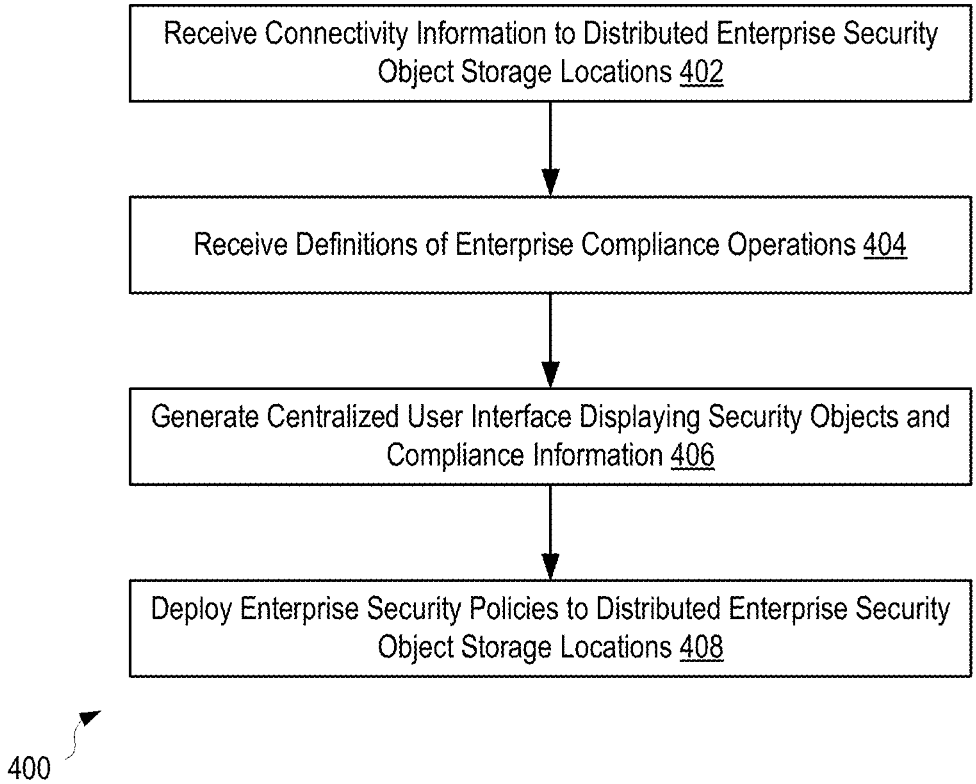
FIG. 4 is a flowchart of a method of managing compliance with security policies of an enterprise for one or more security objects maintained across a distributed set of security object storage locations, according to an example embodiment.
Figure 5:
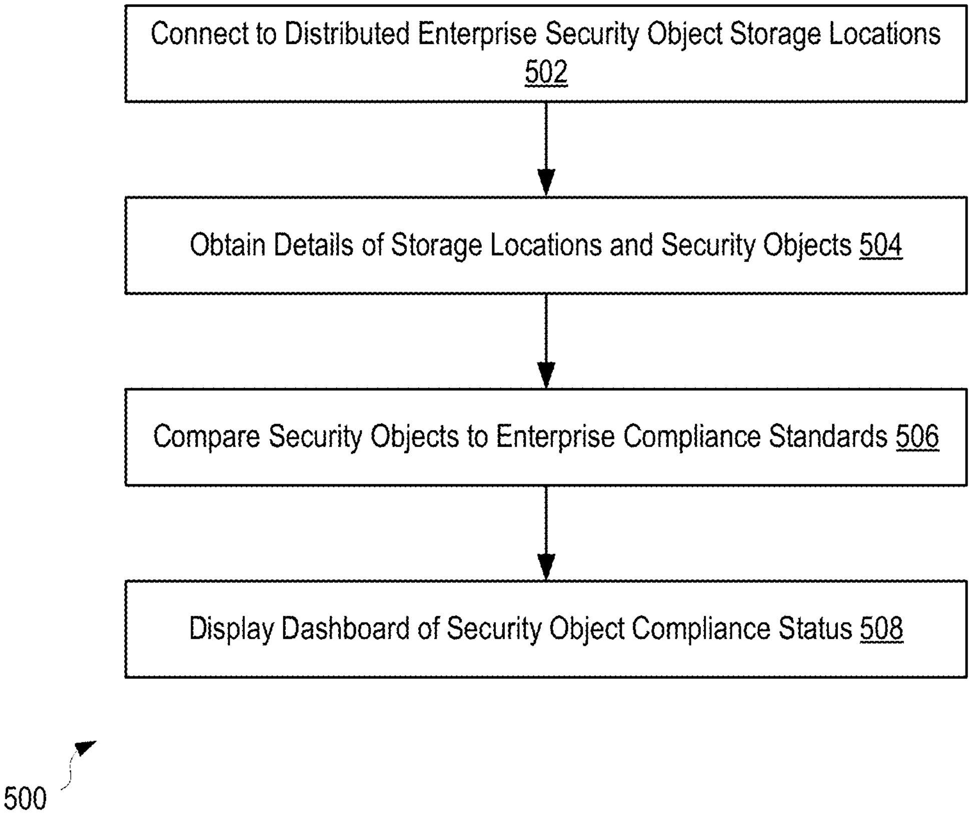
FIG. 5 is a flowchart of a method of generating a centralized user interface at a centralized compliance platform, according to an example embodiment.

Referring now to FIGS. 4-5, methods of centrally managing compliance with security policies of an enterprise are provided. FIG. 4 illustrates a particular method 400 for managing compliance with security policies of an enterprise for one or more security objects maintained across a distributed set of security object storage locations, according to an example embodiment.

In the example shown, the method 400 includes receiving connectivity information associated with one or more security object storage locations (step 402). In examples, the connectivity information may include connection parameters, such as a network address, URL, or the like, as well as authentication information required to establish a connection with such a storage location (e.g., an administrative username and password or other credentials needed to access security object information at the storage location). In some examples, the connectivity information may include connection details for communication with a plurality of physically distributed storage locations. Such storage locations may include vaults, such as key vaults or secret vaults, and the connection parameters may include a vault location for each such a vault, these may include locations within the enterprise, or locations within cloud storage maintained by or on behalf of the enterprise.

In the example shown, the method 400 further includes, based on the connection parameters, communicatively connecting to each of the one or more distributed security object storage locations for which connectivity information was received (step 404). Establishing a connection to each distributed security object storage location may include, for example, submitting a connection request at an interface exposed by each storage location. The interface may be, in some examples, an application programming interface (API) exposed by a key vault, a secrets vault, or a database storing security objects, such as certificates or other security information.

In the example shown, the method 400 also includes generating an administrative user interface at the centralized compliance platform 102 (step 406). The administrative user interface may include a plurality of views, or screens. The views or screens may include, for example, a dashboard view, a vault connection view, a security object view, and or a compliance view. Other views are able to be generated as well. Example views are depicted in FIGS. 6-13.

The method 400 further includes automatically generating one or more compliance alerts, for example as part of generation of the user interface in step 406. The one or more compliance alerts may be generated, for example, based on a comparison of an enterprise policy to information that is associated with the security objects in one or more of the distributed security object storage locations. For example, the compliance alerts may be presented within a user interface, for example within one of the views or screens of the administrative user interface. The compliance alerts may include, for example, alerts regarding a level of compliance with an enterprise policy by the one or more security objects maintained at a particular security object storage location (e.g., a key vault, a secrets vault, and the like), or a level of compliance with an enterprise policy as to the storage location itself (e.g. robustness of security at the location, policies or encryption standards used by the particular storage location, etc.).

In the example shown, the method 400 may further include deploying one or more enterprise security policies or policy adjustments to any of the distributed security object storage locations managed by the enterprise (step 408). The deployment of enterprise security policies from the centralized compliance platform 102 may enable an administrative user to easily manage a variety of distributed security object storage locations and security objects themselves, for example by requiring compliance with enterprise-wide, consistent security policies. These may involve, for example, key generation, expiration, key length, and secure storage standards, as well as standards regarding security at various storage locations, e.g. maintaining keys within hardware security modules (HSMs) and the like.

Referring now to FIG. 5, an example method 500 of generating a centralized user interface at a centralized compliance platform is illustrated. The method may be used, for example, to implement step 406 of FIG. 4, above, and may be performed at a centralized compliance platform 102 described in conjunction with FIGS. 1-2.

In the example shown, the method 500 includes connecting to one or more distributed enterprise security object storage locations (step 502). Connecting to the one or more distributed enterprise security object storage locations may include using, for each location, connection information received from an administrative user to access a storage location, e.g., using authentication information and address information to establish such a connection.

In the example shown, the method 500 includes obtaining details of both the distributed enterprise security object storage locations and security objects stored at those storage locations (step 504). Details of each security object may include, for example, a storage location identification at which the security object is stored, and identifier of the security object, a name of the security object, and expiration date of the security object, and various compliance or documentation information associated with the security object. For example, where the security object corresponds to an encryption key maintained in an enterprise key vault, details of the key may include a rekeying interval of the key, a deletion permission of the key, a source of the key, a name of the key, a particular cipher used for the key, and the like. Details of a storage location for particular objects may include a storage location name, group, identifier, unique identifier (e.g., UUID), owner contact information and name, security object type for the objects stored within the storage location, and an encryption type and encryption algorithm used at the storage location to secure security objects. Such details may also include compliance information, such as a policy name, activation date, creation date, last modification date, status, and compliance status of a particular storage location.

In the example shown, the method 500 includes comparing the security objects to enterprise compliance standards (step 506). Enterprise compliance standards may be maintained within the centralized compliance platform 102 or storage accessible from the platform, and may be used in assessing either security objects or security object storage locations. Compliance may correspond to completed documentation associated with a security object or storage location, as well as compliance with particular policies associated with security objects or locations. Policy compliance may include compliance with a key rotation scheme that requires changing encryption keys within a particular period of time; compliance with a key strength standard that requires keys of a predetermined length or using a predetermined encryption algorithm: compliance with a key expiration scheme that requires expiration of a key within a particular time period, and the like.

In the example shown, the method 500 also includes displaying a dashboard of security object compliance status (step 508). The dashboard of security object compliance status may be presented within an administrative user interface, such as the interfaces described below.

Referring to FIGS. 4-5 generally, by centralizing security object compliance, and in particular key and secret compliance within a management platform, it is possible for enterprise users, in particular administrative users, to reliably manage all security objects owned or controlled by the enterprise, and to ensure that all such security objects are compliant with enterprise-selected standards. Furthermore, presentation of automated alerts within a centralized user interface, and sending policy updates from a central platform to distributed security object storage locations allows such administrative users to avoid having to individually administer policies at each distributed security object storage location.

Referring now to FIGS. 6-14, an administrative user interface 600 is shown in which a variety of screens, or views, may be presented. The administrative user interface 600 may be generated at a centralized compliance platform 102, in whole or in part, for communication to and display at a user device 104, as described above in conjunction with FIGS. 1-2, to achieve at least some of the advantages described previously.

Figure 6:
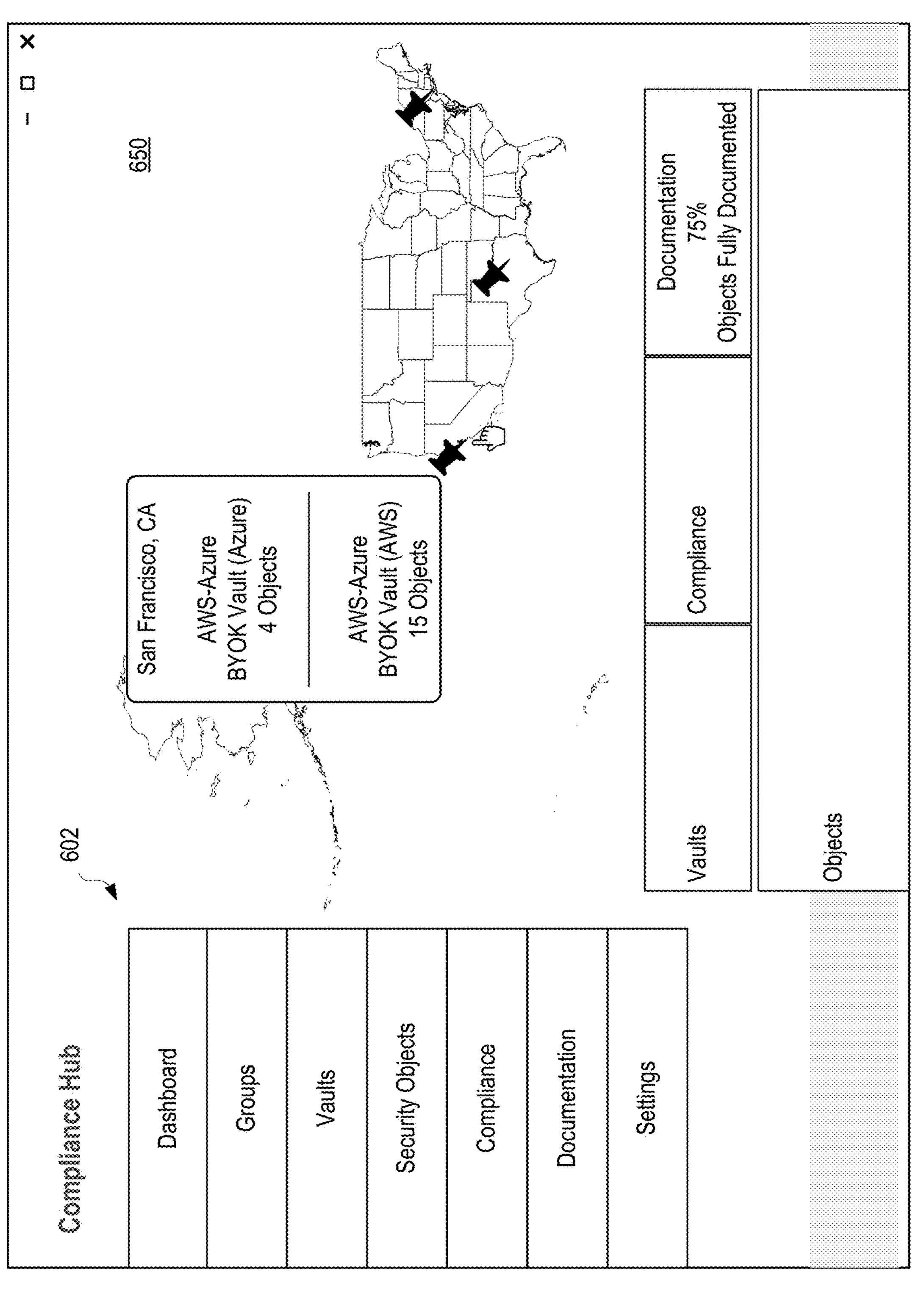
FIG. 6 is an example centralized user interface generated by a centralized compliance platform and displaying a dashboard view, according to an example embodiment.
Figure 7:
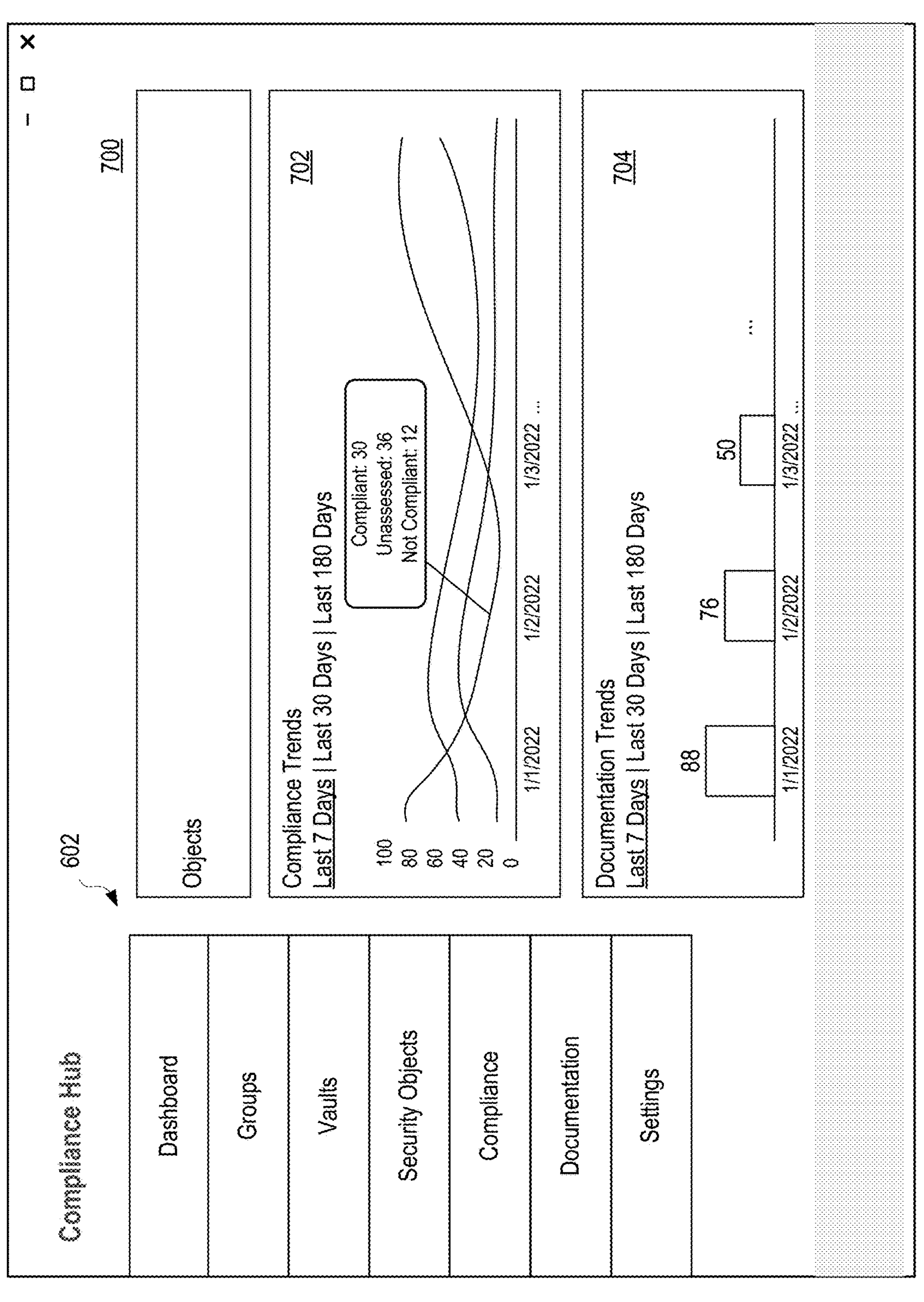
FIG. 7 is an example centralized user interface generated by a centralized compliance platform and displaying a further portion of a dashboard view, according to an example embodiment.

FIGS. 6-7 illustrate views 650, 700, respectively, of the administrative user interface 600. As seen in FIG. 6, the user interface 600 includes a navigation bar 602 of selectable options, including a dashboard option, a groups option, a vaults option, a security objects option, a compliance option, a documentation option, and a settings option. Additionally, within a display area of the user interface 600, view 650 displays a map in which individual security object storage locations are depicted with location identifiers (illustrated as pins). Upon selection of one of the security object storage locations using a cursor or other input mechanism, details regarding that storage location may be displayed, including the location details, type of storage location, number of security objects maintained at the storage location, and the like. Additionally, an overall snapshot of the enterprise may be provided, including a number or details as to the number of state security object storage locations (e.g., vaults), the extent of compliance with enterprise policies, and a definition of the extent to which objects are documented.

As seen in FIG. 7, a further view 700, which may be presented within the same or a different menu area as view 650, is illustrated. View 700 includes one or more displayable regions, including a compliance chart 702 and a documentation chart 704. The compliance chart 702 and documentation chart 704 may be user manipulable to determine trends over various periods of time, as well as snapshots of current and past compliance or documentation status.

Figure 8:
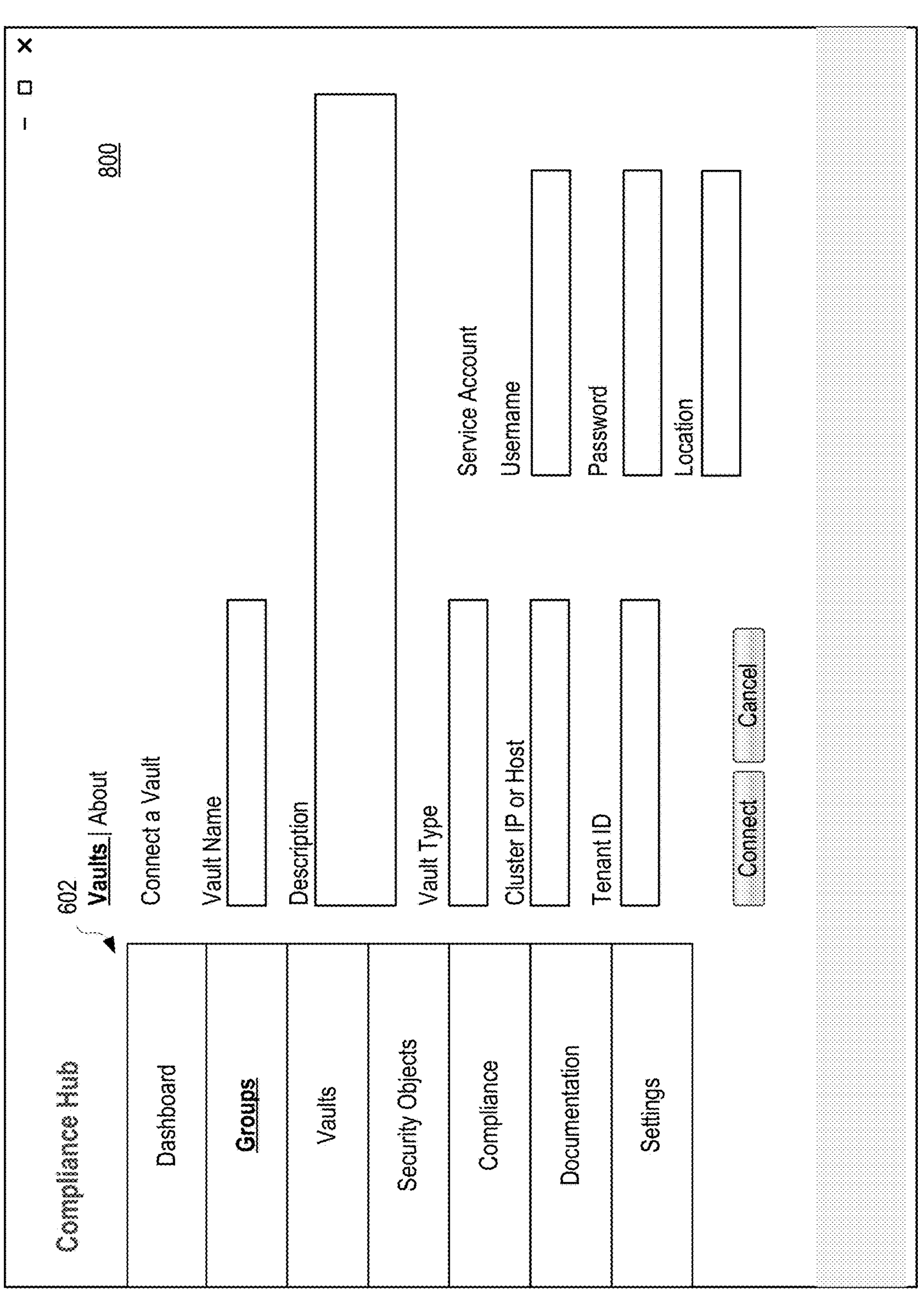
FIG. 8 is an example centralized user interface generated by a centralized compliance platform and displaying a distributed storage location definition view, according to an example embodiment.

FIG. 8 illustrates the user interface 600, and presents a vault connection view 800 within that user interface. In particular, in response to selection of the groups option within the navigation bar 602, view 800 includes a plurality of input fields in which connection details for a particular security object storage location are obtained, e.g., from an administrative user. In the example shown, security details obtained via the vault connection view 800 may include a vault name, description, vault type, IP address or host name, and tenant ID. Additionally, authentication information may be provided, including a username and password. Optionally, location information may be obtained as well.

FIG. 9 illustrates the user interface 600, and presents a vault summary view 900 within that user interface. In particular, in response to selection of the vaults option, a listing of accessible security object storage locations (in this example, key or secret vaults) is provided. The listing may include a name, group, number of security objects maintained therein, compliance status, and documentation status associated with each storage location. Other types of information may be presented as well.

FIG. 10 illustrates a further view generated within the user interface 600, in particular a security objects view 1000 displayed in response to selection of the security objects option within the navigation bar 602. In this example, each of the available security objects from each storage location may be displayed by name, group, storage location, and type. A date of creation may be displayed as well.

Figure 11:
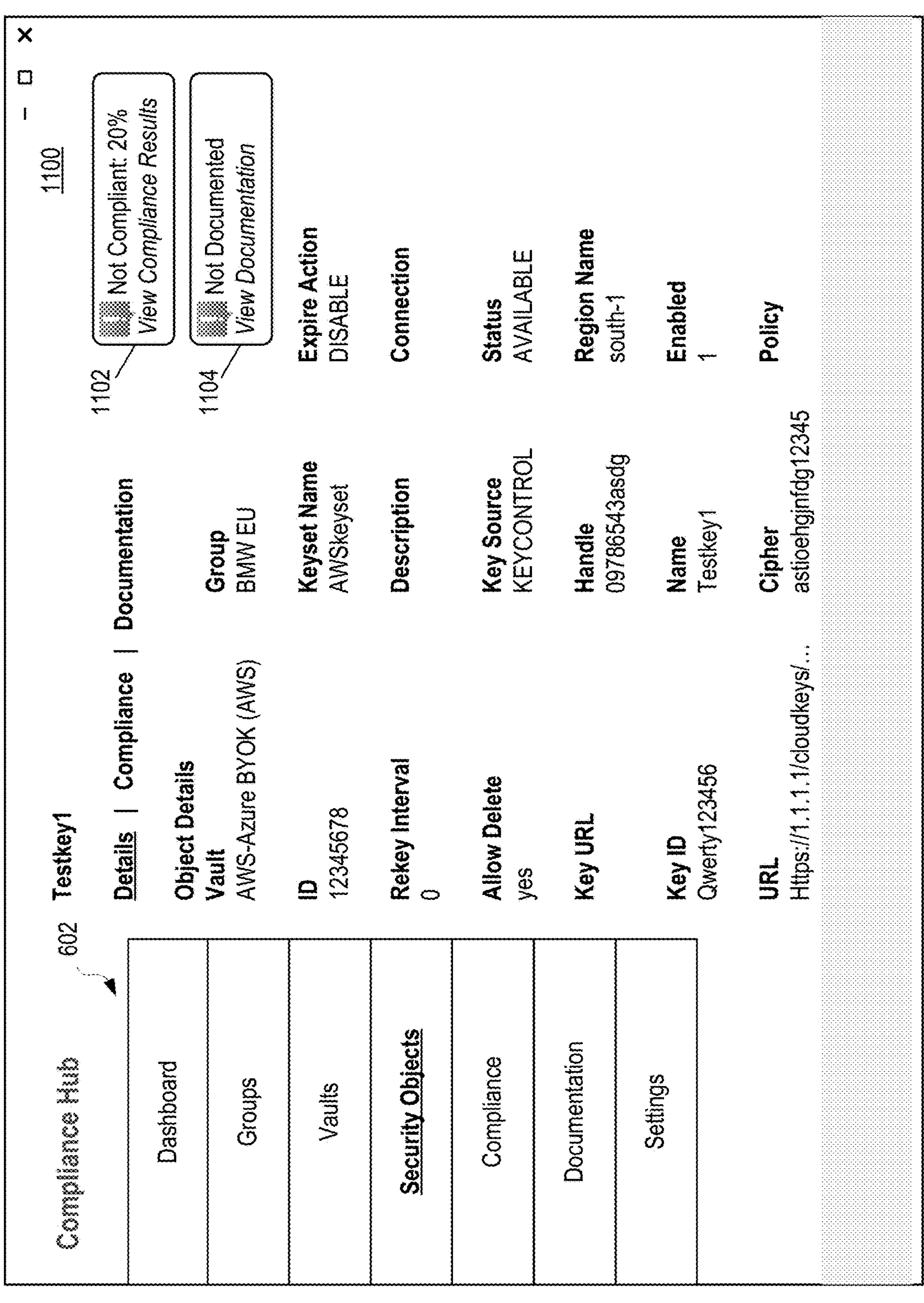
FIG. 11 is an example centralized user interface generated by a centralized compliance platform and displaying a security objects compliance view, according to an example embodiment.

In response to selection of a particular one of the security objects, a further security objects view 1100 may be displayed within the user interface 600, as seen in FIG. 11. In particular, details regarding the selected security object may be depicted. In the example shown, the security object that is selected corresponds to a key maintained within a key vault, and the details include a vault name, vault group, identifier, keyset name, expiration action, rekeying interval, deletion permission, a key source, an availability status, as well as a URL, cipher, and policy information associated with the key. Other information may be presented as well.

In the example shown, the security objects view 1100 includes a compliance alert 1102 and a documentation alert 1104, each of which may be generated for display. The compliance alert 1102 may be generated automatically in response to comparison of key details to one or more compliance policies, such as a rekeying or key expiration policy, or a key strength policy. The compliance alert 1102 may optionally include a selectable option to display additional details regarding a reason for compliance or non-compliance, and may include a rating or percentage compliant score indicating the extent to which the selected security object (e.g., key), is non-compliant. Similarly, the documentation alert 1104 may be automatically generated in response to missing documentation regarding the security object (e.g., an entirely or partially missing policy against which compliance may be assessed, or documentation about the security object itself).

Figure 12:
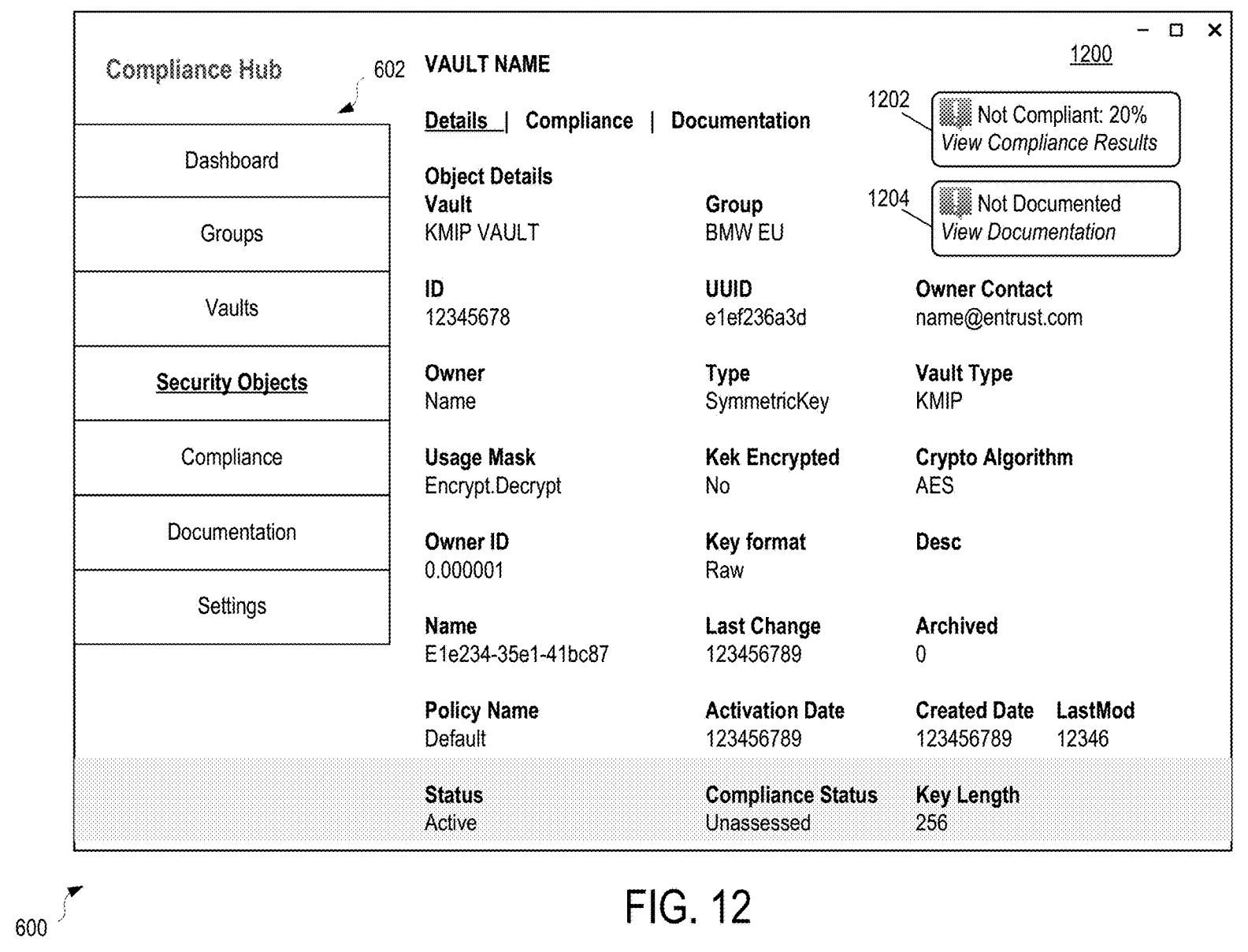

Similarly, in FIG. 12, a further security objects view 1200 presented within the user interface 600 presents information regarding a selected security object storage location, in this example a key vault. The security objects view 1200 may be presented in response to selection of a security object storage location, e.g., from among the list of security objects presented within the vault summary view 900, or on the dashboard/map displayed in view 650 of FIG. 6.

In the example shown, the security object storage location information displayed, in association with a particular location that corresponds to a key vault, includes a vault name, a group to which the fault belongs, a vault ID and unique ID (UU ID), owner contact information and owner name, a security object type stored in the vault (e.g., symmetric, asymmetric, etc.), and vault type (e.g., a Key Management Interoperability Protocol (KMIP) vault, a secrets vault, or a Transparent Data Encryption (TDE) key vault). The information may further include a usage mask, an encryption algorithm used to secure the security objects within the vault, as well as a key format and information regarding a key encryption key that may be used. Additionally, a name of the vault, and a last changed date of the vault a last archived date may be stored and accessible. Still further, a policy name applied at the vault, as well as a status of the policy, the policy activation date, policy creation date, and policy modification date, the vault compliance status, and key length used may be maintained.

In the example shown, the view 1200 includes a compliance alert 1202 and a documentation alert 1204, each of which may be generated for display. The compliance alert 1202 may be generated automatically in response to comparison of storage location details to one or more compliance policies. The compliance alert 1202 may optionally include a selectable option to display additional details regarding a reason for compliance or non-compliance, and may include a rating or percentage compliant score indicating the extent to which the selected storage location (e.g., vault), is non-compliant. Similarly, the documentation alert 1204 may be automatically generated in response to missing documentation regarding the security object (e.g., documentation about the storage location or policies applied at that location).

Figure 13:
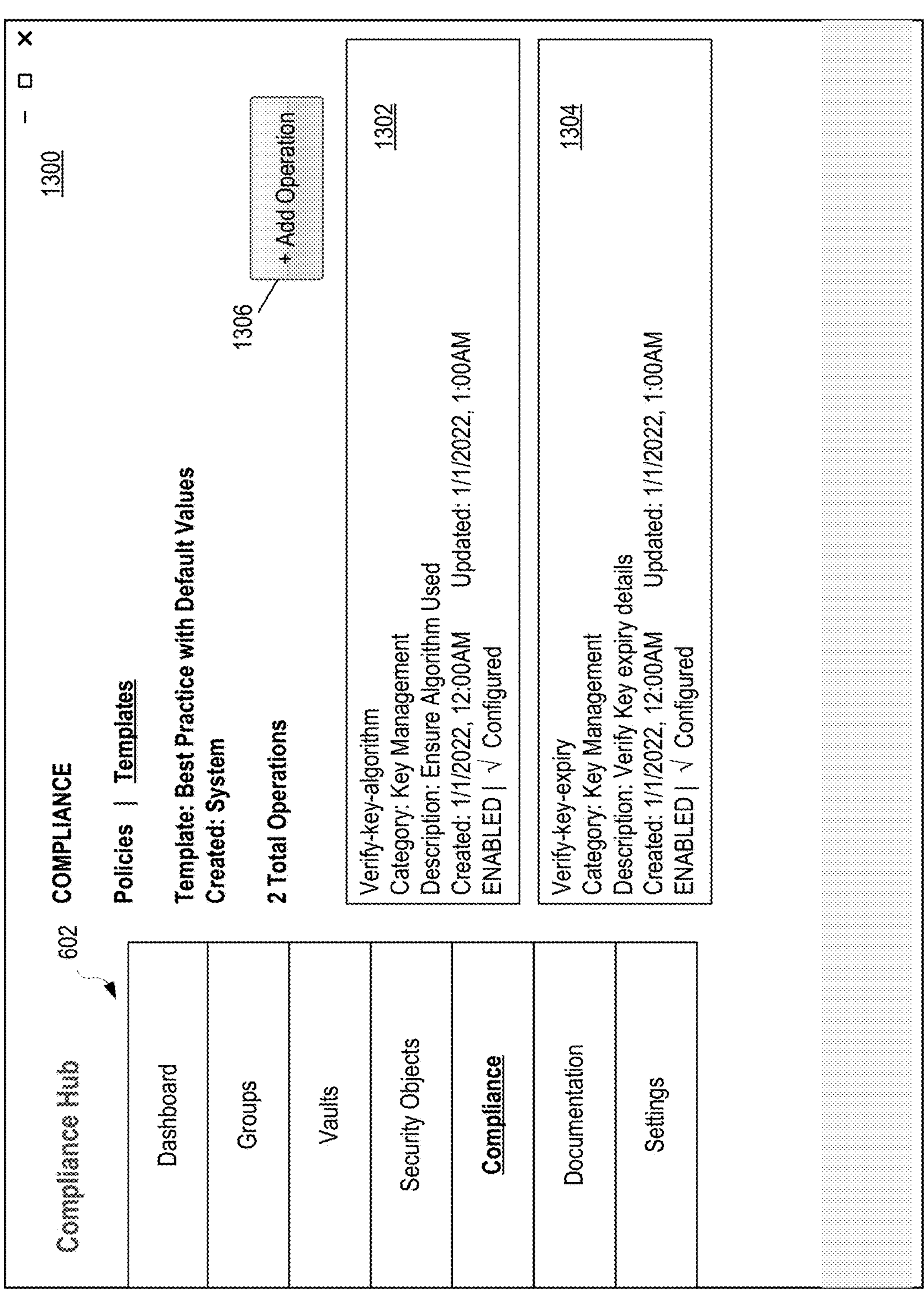
FIG. 13 is an example centralized user interface generated by a centralized compliance platform and displaying a policy compliance definition view, according to an example embodiment.

FIG. 13 shows a compliance view 1300 displayed within the user interface 600, in which a plurality of compliance operations may be defined. Compliance operations may include definitions of specific policies, or portions of policies, that may be centrally assessed and enforced by the centralized compliance platform 102. In the example shown, two such compliance operations are defined: a key verification algorithm 1302, in which a key algorithm test is performed to determine whether a key or key vault uses an appropriate key generation algorithm, and a key expiration verification algorithm 1304, in which a key expiry test is performed to determine whether a key managed at a particular key vault is set to expire within an acceptable time period (e.g., to ensure that stale keys are not used). The compliance view 1300 also includes an operation addition option 1306, which allows an administrative user to define one or more other compliance operations. The compliance operations may be used, at least in part, to determine a level of compliance by the various security objects and security object storage locations as reflected by compliance alerts 1102, 1202 of FIGS. 11-12, and also may be automatically sent to those storage locations to which the centralized compliance platform is connected. This ensures that those distributed storage locations maintain a common security policy, despite maintaining decentralized storage.

Figure 14:
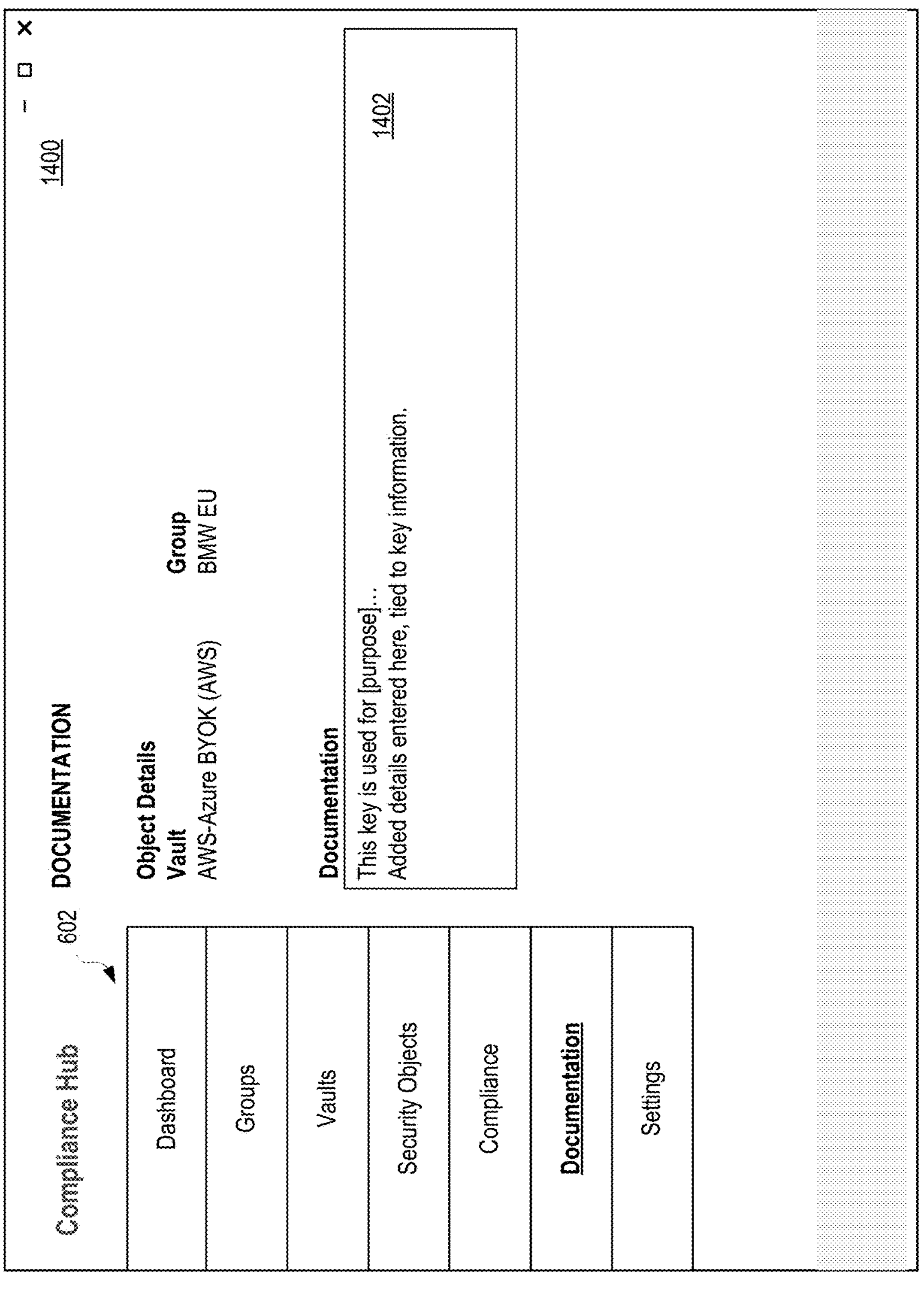
FIG. 14 is an example centralized user interface generated by a centralized compliance platform and displaying a documentation view, according to an example embodiment.

FIG. 14 shows a documentation view 1400 displayed within the user interface 600. The documentation view may be associated with a particular security object or security object storage location (e.g., a key or a key vault, or other storage objects/locations). In accordance with an example embodiment, a free text entry screen may allow a user to define details associated with a particular security object or storage location which may be stored in metadata associated with that object or location. In particular, a description entry field 1402 may receive user text entry, which may then be saved in a documentation metadata field. Such documentation metadata may be stored and retrieved alongside other information associated with the security object or storage location for display, for example, with others of the user interfaces of FIGS. 6-13. In some examples, such saved documentation may be displayable upon selection of a documentation option associated with a security object or location, for example the documentation option displayed in the view 1100 of FIG. 11.

Furthermore, upon addition of documentation associated with a particular security object or security object storage location, alerts associated with compliance and documentation may be updated. For example, in the view 1100 of FIG. 11, documentation alert 1104 indicates that no documentation is associated with the selected security object. In examples, addition of documentation within the description entry field 1402 may result in resolving the alert, causing the user interface to cease display of that alert.

Referring to FIGS. 1-14 generally, it is noted that the centralized compliance platform described herein, including the various user interfaces and communicative connections to distributed storage locations, allows for centralized management of security objects of an enterprise, including a consolidated view of all such security objects. Additionally, management of security objects may be performed centrally despite maintaining security objects in decentralized, distributed storage locations. That is, for example, each key, secret, or certificate may be maintained in its distributed storage location, information about those locations and security objects may be retrieved and viewed, and policy compliance may be centrally assessed, with policy updates pushed to those distributed locations. This significantly simplifies the process of managing policy compliance for security objects without requiring centralized storage of security objects. Furthermore, because centralized storage is not required, the centralized management process is highly scalable.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

The invention claimed is:

1. A security object compliance management platform comprising:

a computing system including a processor and memory, the memory storing instructions executable by the processor to:

receive connection parameters for each of a plurality of distributed vaults, each vault storing security information used by an enterprise, the connection parameters including a vault location and account details useable for access to security objects maintained within the respective vault;

based on the connection parameters, communicatively connect to each of the plurality of distributed vaults;

determine one or more enterprise compliance policies applicable to security objects maintained across the enterprise;

generate an administrative user interface at the security object compliance management platform, the administrative user interface having a plurality of views including a dashboard view, a vault connection view, a security object view, and a compliance view;

calculate, for each vault of the plurality of distributed vaults, a first compliance rating based, at least in part, on aggregated compliance evaluations of the security objects stored within the vault, each compliance evaluation including a comparison of the one or more enterprise compliance policies to information associated with the corresponding security object;

automatically generate one or more compliance alerts based on the first compliance ratings, the one or more compliance alerts being presented in at least one of the plurality of views;

receive an update to the information associated with at least one of the security objects in a vault of the plurality of distributed vaults; and calculate a second compliance rating for the vault based, at least in part, on a comparison of the one or more enterprise compliance policies to the updated information associated with the security objects in the vault.

2. The security object compliance management platform of claim 1, wherein the one or more compliance alerts are presented in the security object view.

3. The security object compliance management platform of claim 1, wherein the computing system is further configured to transmit, to one or more of the plurality of distributed vaults, one or more policy notifications identifying one or more security objects that are non-compliant with the one or more enterprise compliance policies.

4. The security object compliance management platform of claim 3, wherein the computing system is further configured to transmit the one or more enterprise compliance policies to the one or more of the plurality of distributed vaults.

5. The security object compliance management platform of claim 1, wherein the computing system is further configured to receive one or more compliance policies within the compliance view, the one or more compliance policies defined as operations testing compliance with a security standard associated with the security objects.

6. The security object compliance management platform of claim 5, wherein the operations include a key algorithm test to determine whether a particular encryption algorithm used in association with an encryption key is among a plurality of acceptable encryption algorithms.

7. The security object compliance management platform of claim 5, wherein the operations include a key expiry test to determine whether a key has an expiration period within a predetermined key expiration duration defined by the enterprise.

8. The security object compliance management platform of claim 1, wherein the security objects include encryption keys managed within the enterprise in the plurality of distributed vaults.

9. The security object compliance management platform of claim 8, wherein the security objects include security secrets managed within the enterprise in one or more of the plurality of distributed vaults.

10. The security object compliance management platform of claim 8, wherein the security objects include one or more certificates issued by the enterprise and stored within one or more enterprise security databases maintained by the enterprise.

11. The security object compliance management platform of claim 1, wherein the plurality of distributed vaults includes a plurality of different types of vaults, the plurality of different types of vaults including a Key Management Interoperability Protocol (KMIP) vault, a secrets vault, and a Transparent Data Encryption (TDE) key vault.

12. The security object compliance management platform of claim 1, wherein the plurality of distributed vaults is maintained across an enterprise infrastructure that includes one or more distributed enterprise computing systems and one or more cloud instances implemented on third party cloud computing infrastructure.

13. The security object compliance management platform of claim 1, wherein communicatively connecting to each of the plurality of distributed vaults includes obtaining metadata describing security objects maintained within the plurality of distributed vaults without retrieving the security objects from the plurality of distributed vaults.

14. A method of managing compliance with security policies of an enterprise for one or more security objects maintained across a distributed set of security object storage locations, the method comprising:

receiving, at a compliance management platform, connection parameters for each of a plurality of distributed security object storage locations, each security object storage location storing security information used by the enterprise, the connection parameters including a vault location and account details useable for access to security objects maintained within the respective security object storage location;

based on the connection parameters, communicatively connecting the compliance management platform to each of the plurality of distributed security object storage locations;

determining, at the compliance management platform, one or more enterprise compliance policies applicable to security objects maintained across the enterprise;

generating an administrative user interface at the compliance management platform, the administrative user interface having a plurality of views including a dashboard view, a vault connection view, a security object view, and a compliance view;

calculating, for each security object storage location of the security object storage locations, a first compliance rating based, at least in part, on aggregated compliance evaluations of the security objects stored within the security object storage location, each compliance evaluation including a comparison of the one or more enterprise compliance policies to information associated with the corresponding security object;

automatically generating one or more compliance alerts based on the first compliance ratings, the one or more compliance alerts being presented in at least one of the plurality of views;

receiving an update to the information associated with at least one of the security objects in a security object storage location of the plurality of distributed security object storage locations; and calculating a second compliance rating for the security object storage location based, at least in part, on a comparison of the one or more enterprise compliance policies to the updated information associated with the security objects in the security object storage location.

15. The method of claim 14, wherein communicatively connecting to each of the plurality of distributed security object storage locations includes obtaining metadata describing security objects maintained within the plurality of distributed security object storage locations without retrieving the security objects from the plurality of distributed security object storage locations.

16. The method of claim 15, wherein the security objects include:

encryption keys managed within the enterprise in the plurality of security object storage locations;

security secrets managed within the enterprise in one or more of the plurality of security object storage locations; and one or more certificates issued by the enterprise and stored within one or more enterprise security databases maintained by the enterprise.

17. The method of claim 16, wherein the plurality of security object storage locations includes a plurality of different types of vaults, the plurality of different types of vaults including a Key Management Interoperability Protocol (KMIP) vault, a secrets vault, and a Transparent Data Encryption (TDE) key vault.

18. The method of claim 15, wherein communicatively connecting to each of the plurality of distributed security object storage locations is performed in response to receiving the connection parameters.

19. The method of claim 15, further comprising transmitting, from the compliance management platform to one or more of the plurality of distributed security object storage locations, one or more policy notifications identifying one or more security objects that are non-compliant with the one or more enterprise compliance policies.

20. A non-transitory computer-readable medium comprising computer-executable instructions installed thereon, the computer-executable instructions being executable by a computing system to cause the computing system to perform a method of managing compliance with security policies of an enterprise for one or more security objects maintained across a distributed set of security object storage locations, the method comprising:

receiving connection parameters for each of a plurality of distributed security object storage locations at a compliance management platform, each security object storage location storing security information used by the enterprise, the connection parameters including a vault location and account details useable for access to security objects maintained within the respective security object storage location;

based on the connection parameters, communicatively connecting the compliance management platform to each of the plurality of distributed security object storage locations;

determining one or more enterprise compliance policies applicable to security objects maintained across the enterprise;

generating an administrative user interface at the compliance management platform, the administrative user interface having a plurality of views including a dashboard view, a vault connection view, a security object view, and a compliance view;

calculating, for each security object storage location of the security object storage locations, a first compliance rating based, at least in part, on aggregated compliance evaluations of the security objects stored within the security object storage location, each compliance evaluation including a comparison of the one or more enterprise compliance policies to information associated with the corresponding security object;

automatically generating one or more compliance alerts based, at least in part, on a comparison of the one or more enterprise compliance policies to information associated with the security objects across the plurality of distributed security object storage locations, the one or more compliance alerts being presented in at least one of the plurality of views;

receiving an update to the information associated with at least one of the security objects in a security object storage location of the plurality of distributed security object storage locations; and calculating a second compliance rating for the security object storage location based, at least in part, on a comparison of the one or more enterprise compliance policies to the updated information associated with the security objects in the security object storage location.

* * * * *